2,989,505
SUSPENSION POLYMERIZATION

Donald E. Hudgin, Summit, and Frank M. Berardinelli, South Orange, N.J., assignors to Celanese Corporation of America, New York, N.Y., a corporation of Delaware
No Drawing. Filed Oct. 21, 1957, Ser. No. 691,142
15 Claims. (Cl. 260—67)

This invention relates to an improved method for producing a tough, high molecular weight material by the polymerization of trioxane.

It is known that trioxane may be polymerized in the presence of small amounts of certain catalytic materials, principally fluorine-containing materials, to produce a tough, high molecular weight polymer, known as polyoxymethylene which may be used to produce molded or extruded products. The procedures utilized involve the blending of molten trioxane with the catalytic material, when the latter is normally solid or normally liquid material or the contacting of the gasiform catalytic material with molten or solid trioxane. The use of gasiform catalytic material involves obvious handling difficulties and does not effect uniform contact between the reactants.

Such procedures, even with solid or liquid catalytic materials, are disadvantageous in that they are not readily adaptable to large scale and particularly to continuous production methods. They are also disadvantageous, particularly with rapidly acting catalytic materials in that they do not permit uniform admixture of the reaction components before substantial reaction takes place.

When polymerization takes place in molten trioxane with a highly effective catalyst conversion to the polymer is substantially complete and the polymer formed fills the entire volume of the reaction mass. In order to subject the polymer produced to washing or other purification procedures, the polymer mass must be broken up mechanically. This is costly and impractical for large scale production.

In an improved process, disclosed in our application Serial No. 691,145, filed concurrently herewith, the trioxane is dissolved in a large volume of a non-aqueous solvent and polymerization takes place in solution with the polymer precipitating out of solution as it is formed. However, polymerization generally proceeds more slowly in solution probably due to the dilution of the monomer molecules by molecules of solvent and consequently less frequent collisions between monomer molecules.

It is an object of this invention to provide a novel procedure whereby catalytic polymerization of trioxane may proceed to produce a uniform and easily handleable product at a higher conversion rate than previously possible. Other objects will appear hereinafter.

The objects of this invention are accomplished by a process which comprises polymerizing trioxane in the presence of a trioxane-polymerization catalyst in a suspension comprising a continuous phase containing an inert, non-aqueous liquid which is at least partially a non-solvent for trioxane and a dispersed phase containing trioxane.

With respect to handling characteristics, polymerization in suspension is similar to polymerization in solution in that each produces a polymer finely dispersed in a liquid medium. But with respect to the polymerization reaction, polymerization in suspension is more comparable to bulk polymerization since the concentration of monomer within each suspended droplet is high and the molecules are subject to frequent collisions.

The catalyst may be added to the suspension, or it may be added to the suspension medium prior to the suspension of trioxane therein. For best results, the catalyst should be soluble in the suspension medium although such polymerization will take place even in the absence of such solubility.

In the preferred aspects of the invention, a catalyst capable of rapid polymerization is used and preferably a catalyst which will polymerize molten trioxane in bulk to the extent of 40 weight percent in one hour at a temperature allowed to rise from 70° to 100° C. when used at a concentration of 0.01 weight percent. The procedure of this invention is particularly useful with catalysts comprising boron fluoride coordinate complexes with organic compounds in which oxygen or sulfur is the donor atom. Such complexes are described in our application Serial No. 691,143, filed concurrently herewith.

Any of the known catalysts for the polymerization of trioxane may be used in accordance with this invention. It is known, for example, that inorganic fluorine-containing catalysts, such as antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride and fluosulfonic acid are effective catalysts for polymerizing trioxane to a tough, high molecular weight material. Other catalysts recently found to be effective in addition to the boron fluoride coordinate complexes disclosed above and in addition to boron fluoride which is disclosed in our application Serial No. 691,144, filed concurrently herewith, are thionyl chloride, organic sulfonic acids, phosphorus trichloride, titanium tetrachloride, ferric chloride, zirconium tetrachloride, aluminum trichloride and stannic chloride. Stannous chloride, previously reported to have no catalytic activity has been found to be an effective catalyst.

The amount of catalyst used will vary depending on the nature of the catalyst and its solubility in the suspension medium. Generally amounts between about .001 and about 1.0 weight percent, based on the weight of the trioxane may be used.

The preferred non-solvents are the normal paraffinic hydrocarbons having from 7 to 20 carbon atoms. Mixtures of such hydrocarbons may be used, including petroleum fractions which contain high proportions of straight chain paraffins. The amount of non-solvent used will generally vary between about 0.5 and 10 parts by weight per part of trioxane.

It is desirable that the suspended trioxane be in liquid phase. In order to assure a liquid suspended phase, the temperature of the suspension should be no lower than the melting point of trioxane. The upper temperature limit may be as high as the boiling point of trioxane or even higher when the system is under pressure. Preferably, the polymerization reaction should be carried out in the lower portion of this temperature range where solubility of the trioxane in the inert liquid is minimal. Temperatures between about 64° and about 75° C. are preferred.

The suspension is maintained during polymerization by vigorous stirring. In some cases, it may be desirable to carry out the polymerization reaction in the presence of a surface active agent so that the particles may be more finely dispersed than by mechanical means. Sodium lauryl sulfate is a preferred surface active agent.

Example

One hundred parts by weight of trioxane was mixed with 73 parts by weight of normal decane and heated to 70° C. with rapid stirring to form a suspension of the molten trioxane in decane. Then 0.07 parts by weight of BF$_3$-etherate was added. Polymer began to form in a few minutes. The temperature rose to 73° C. The reaction mixture was held at 68° C. and stirred overnight. The reaction product was filtered off and washed twice with ether. The polymer was then washed three times with water at 90 to 95° C., and dried overnight at 60 to 65° C. in an air-circulating oven. 56.3 parts by weight of polymer was recovered. The polymer had an inherent viscosity of 0.86 when measured in p-chlorophenol (containing 2% alpha pinene) at 60° C. at 0.5% weight concentration.

On stabilizing the polymer with 5% diphenylamine, it was molded at 180° C. for two minutes to produce white translucent discs.

It is to be understood that the foregoing detailed description is given merely by way of illustration and that many variations may be made therein without departing from the spirit of our invention.

Having described our invention, what we desire to secure by Letters Patent is:

1. A process for obtaining tough, high molecular weight material which comprises polymerizing trioxane in contact with a catalytic amount of a trioxane-polymerization catalyst in a suspension comprising a continuous phase containing an inert, non-aqueous liquid which is at least partially a non-solvent for trioxane and a dispersed phase containing trioxane.

2. A process for obtaining a tough, high molecular weight material which comprises suspending trioxane in an inert non aqueous liquid which is at least partially a non-solvent for trioxane adding a catalytic amount of a trioxane-polymerization catalyst and polymerizing the trioxane.

3. A process for obtaining tough, high molecular weight material which comprises suspending trioxane in an inert, non-aqueous liquid which is at least partially a non-solvent for trioxane and which contains a catalytic amount of a trioxane-polymerization catalyst and polymerizing trioxane in the resulting suspension.

4. A process for obtaining tough, high molecular weight material which comprises suspending one part by weight of trioxane in from about 0.5 to about 10 parts by weight of an inert non-aqueous liquid which is at least partially a non-solvent for trioxane and polymerizing said suspension in contact with a catalytic amount of a trioxane-polymerization catalyst.

5. A process for obtaining tough, high-molecular weight material which comprises polymerizing trioxane in contact with a catalytic amount of a trioxane-polymerization catalyst in a suspension comprising a continuous phase containing a straight chain paraffinic hydrocarbon having from about 7 to about 20 carbon atoms per molecule and a dispersed phase containing trioxane.

6. The process of claim 5 wherein said straight chain paraffinic hydrocarbon is n-decane.

7. The process of claim 5 wherein said straight chain paraffinic hydrocarbon is n-heptane.

8. A process for obtaining tough, high molecular weight material which comprises polymerizing trioxane in contact with a catalytic amount of boron fluoride in a suspension comprising a continuous phase containing an inert, non-aqueous liquid which is at least partially a non-solvent for trioxane and a dispersed phase containing trioxane.

9. The process of claim 8 wherein said inert, non-aqueous liquid is a straight chain paraffinic hydrocarbon having from about 7 to about 20 carbon atoms.

10. Process for obtaining tough, high molecular weight material which comprises polymerizing trioxane in contact with a catalytic amount of a coordinate complex of boron fluoride with an organic compound in which oxygen is a donor atom in a suspension comprising a continuous phase containing an inert non-aqueous liquid which is at least partially a non-solvent in trioxane and a dispersed phase containing trioxane.

11. The process of claim 10 in which said inert non-aqueous liquid is a straight chain paraffinic hydrocarbon having from about 7 to about 20 carbon atoms.

12. The process of claim 1 wherein said inert non-aqueous liquid contains a surface active agent.

13. The process of claim 1 wherein said catalyst is a rapid polymerization catalyst which will polymerize molten trioxane in bulk to the extent of 40 weight percent in one hour at a temperature allowed to rise from 70° to 100° C. when used at a concentration of 0.01 weight percent.

14. Process for obtaining tough, high-molecular weight material which comprises polymerizing trioxane in contact with from about 0.001 to about 1.0 weight percent, based on the weight of trioxane, of a coordinate complex of boron fluoride with an organic compound in which oxygen is the donor atom in a suspension comprising a continuous phase containing a straight chain paraffinic hydrocarbon having from about 7 to about 20 carbon atoms and a dispersed phase containing liquid trioxane.

15. The process of claim 14 wherein said polymerization takes place at a temperature between about 64° and about 75° C.

References Cited in the file of this patent

UNITED STATES PATENTS

| 2,270,135 | Mikeska et al. | Jan. 13, 1942 |
| 2,768,994 | MacDonald | Oct. 30, 1956 |
| 2,795,571 | Schneider | June 11, 1957 |

OTHER REFERENCES

Staudinger: "Hochmolekulore Organische Verbindungen" (1932), pp. 255–262.

Walker: "Formaldehyde," ACS Monograph #120 (1953), pp. 143–146.